US008060969B2

(12) United States Patent
Jones

(10) Patent No.: US 8,060,969 B2
(45) Date of Patent: Nov. 22, 2011

(54) CLOTH ACCESSORY WITH REMOVABLE INSERT

(75) Inventor: Darren Jones, American Fork, UT (US)

(73) Assignee: Alpine Innovations, LLC, American Fork, UT (US)

( * ) Notice: Subject to any disclaimer, the term of this patent is extended or adjusted under 35 U.S.C. 154(b) by 914 days.

(21) Appl. No.: 11/972,046

(22) Filed: Jan. 10, 2008

(65) Prior Publication Data

US 2009/0178218 A1     Jul. 16, 2009

(51) Int. Cl.
*A47L 25/00* (2006.01)
(52) U.S. Cl. .................. 15/105; 15/209.1; 15/210.1
(58) Field of Classification Search ............... 15/209.1, 15/210.1, 214, 105; *B08B 11/00; A47L 13/16*
See application file for complete search history.

(56) References Cited

U.S. PATENT DOCUMENTS

| | | | |
|---|---|---|---|
| 2,204,947 A | 6/1940 | Apfelbaum | |
| 2,233,157 A * | 2/1941 | Cahn et al. | 206/361 |
| 2,530,746 A | 11/1950 | Wetherby | |
| 3,350,736 A | 11/1967 | Frazelle et al. | |
| 4,232,808 A | 11/1980 | Gray | |
| 4,516,616 A | 5/1985 | Fesler | |
| 4,854,449 A | 8/1989 | Fitzhugh | |
| 4,953,603 A | 9/1990 | Holden | |
| 5,009,327 A * | 4/1991 | Levison | 220/890 |
| 5,131,112 A * | 7/1992 | Cervini | 15/209.1 |
| 5,161,683 A | 11/1992 | Smith | |
| 5,398,424 A | 3/1995 | Corcoran | |
| 5,419,477 A * | 5/1995 | Verge | 224/274 |
| 5,770,284 A | 6/1998 | Logemann | |
| 6,108,855 A | 8/2000 | DeLeon | |
| 6,131,232 A | 10/2000 | Eddy et al. | |
| 6,849,135 B2 | 2/2005 | Jones | |
| 7,178,193 B2 | 2/2007 | Jones | |
| 7,413,614 B2 | 8/2008 | Jones | |
| 7,416,610 B2 | 8/2008 | Jones | |
| 7,442,259 B2 | 10/2008 | Jones | |
| D580,161 S | 11/2008 | Jones | |
| 2001/0047534 A1 | 12/2001 | Sandusky | |
| 2003/0213080 A1 * | 11/2003 | Jones | 15/214 |

FOREIGN PATENT DOCUMENTS

| | | |
|---|---|---|
| CN | 1655713 | 8/2005 |
| CN | 100353900 C | 12/2007 |
| EP | 000837067-0001 | 1/2008 |
| GB | 304989 | 1/1929 |
| WO | WO 03/082069 | 10/2003 |

* cited by examiner

*Primary Examiner* — Monica Carter
*Assistant Examiner* — Stephanie Newton
(74) *Attorney, Agent, or Firm* — Thorpe North & Western LLP

(57) ABSTRACT

A cloth accessory includes a cover member of a soft and flexible material, which forms an enclosure having an opening therein. An insert is configured to fit within the cover member and hold the opening of the cover member in an open position with a substantially constant size and shape. A cloth is coupled to the cover member and has a first and second configuration. The cloth is retracted substantially into the cover member for storage in the first configuration. In the second configuration the cloth is extended through the insert and the opening of the cover member, and substantially out of the cover member for use while remaining coupled to the cover member. An associated method for cleaning or treating a device includes providing a cloth accessory, orienting the cloth into the second configuration and contacting a device with the cloth to clean or treat the device.

16 Claims, 5 Drawing Sheets

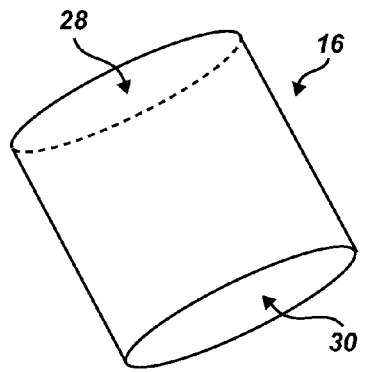
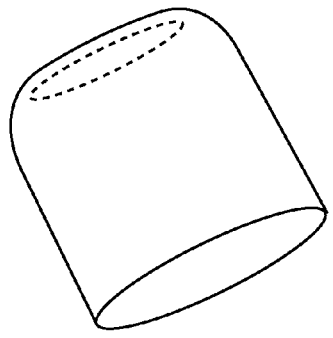
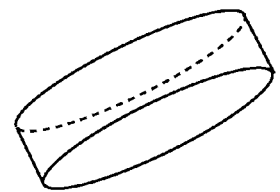
*Fig. 4a*  *Fig. 4b*  *Fig. 4c*
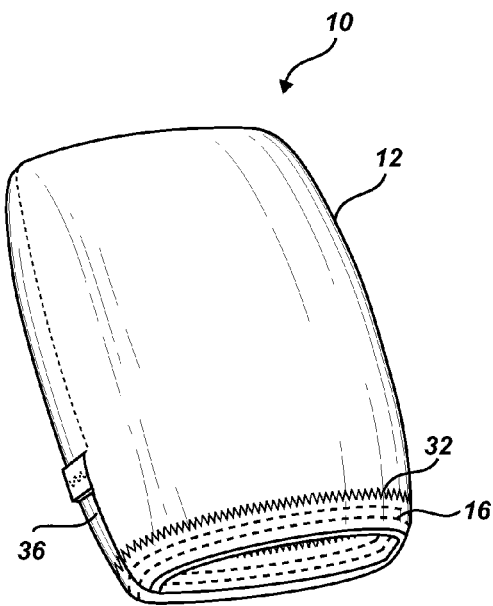
*Fig. 5*

US 8,060,969 B2

CLOTH ACCESSORY WITH REMOVABLE INSERT

BACKGROUND

A number of devices and surfaces benefit from the use of a cloth or other absorbent device for cleansing or polishing. Some devices and surfaces are easily soiled, smudged and fingerprinted, thus requiring frequent cleaning. Such devices may include lenses, such as glasses, goggles, high power magnification scopes, cameras, binoculars, safety glasses, sunglasses, etc. In addition, devices and surfaces that are touched or handled often may require periodic cleaning. These devices and surfaces include, among other things, telephones, electronic devices, such as cell phones, digital cameras, digital music players, personal digital assistants, video game consoles, handheld video game consoles, etc., as well as protective covers and cases for such devices. Surfaces such as those on windows, televisions, and computer display screens, may also require periodic cleaning to maintain suitable visibility.

Many of these surfaces and devices may require maintenance and cleaning during activities in which they are being used. Accordingly, it is desirable that the cleaning cloth for these devices and surfaces be handy, convenient, and easy to use during a variety of activities and in various settings.

SUMMARY OF THE INVENTION

The present invention provides a cloth accessory that is portable, handy, and convenient, for use in cleaning or treating a device or surface. In one aspect, the cloth accessory includes a cover member of a soft and flexible material forming an enclosure with an opening therein to be maintained in a substantially constant size and shape. An insert can fit within the cover member and hold the opening of the cover member in an open position with the substantially constant size and shape. In a preferred aspect, the insert can line at least a portion of an inner surface of the cover member. The insert can be rigid or semi-rigid, and thus the soft and flexible material of the cover member can stretch over the outside of the insert such that a substantial friction fit exists between the two components. In such cases, the cover member may take the shape of the insert, which can be formed in almost any shape ranging from a cylindrical shape to more elaborate, geometric and detailed shapes. In some aspects the insert can be removed from the cover member. However, the insert can also be fixedly attached to the cover member. In one specific aspect, the insert can be ring-shaped and positioned within a secured fold around the opening of the cover member.

A cloth, which in some aspects can be an extension of the cover member, may be coupled to the cover member at, for example, a point opposite the opening of the cover member. The cloth can retract into the cover member for storage when not in use. An optional flap integral with or coupled to the cover member can fold over an outside portion of the cover member and substantially close the opening to secure the cloth inside the cover member. When in use, the cloth can be extended through the insert and the opening of the cover member, and out of the cover member while remaining coupled to the cover member.

The present invention further provides a method for cleaning or treating a device or surface. The method includes providing a cloth accessory consistent with the cloth accessory described herein. The cloth can be oriented into a configuration wherein it is extended through the insert and opening and out of the cover member. A user can contact the device or surface with the cloth in manner sufficient to clean or treat the device or surface.

There has thus been outlined, rather broadly, the more important features of the invention so that the detailed description thereof that follows may be better understood, and so that the present contribution to the art may be better appreciated. Other features of the present invention will become clearer from the following detailed description of the invention, taken with the accompanying drawings, or may be learned by the practice of the invention.

BRIEF DESCRIPTION OF THE DRAWINGS

FIGS. 4a-4c illustrate various embodiments of an insert in accordance the present invention;

FIG. 5 is a perspective view of a cloth accessory wherein the insert is contained within a secured fold around the opening of the cover member.

DETAILED DESCRIPTION

Figure 1:
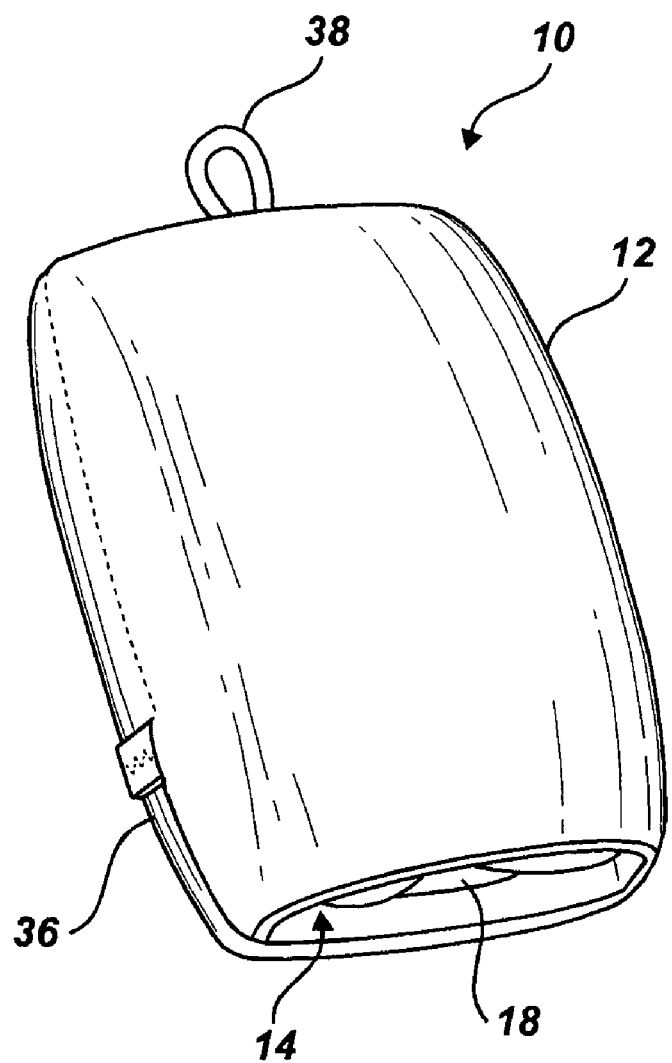
FIG. 1 is a perspective view of a cloth accessory wherein the cloth is retracted into the cover member for storage.

Before the present cloth accessory and accompanying methods of use and manufacture are disclosed and described, it is to be understood that this invention is not limited to the particular process steps and materials disclosed herein, but is extended to equivalents thereof as would be recognized by those ordinarily skilled in the relevant arts. It should also be understood that terminology employed herein is used for the purpose of describing particular embodiments only and is not intended to be limiting.

It must be noted that, as used in this specification and the appended claims, the singular forms "a," "an," and, "the" include plural referents unless the context clearly dictates otherwise. Thus, for example, reference to "the material" or "a cloth" includes reference to one or more of such materials.

Definitions

In describing and claiming the present invention, the following terminology will be used in accordance with the definitions set forth below.

As used herein, "cloth" refers to any, flexible, absorbent, fabric that can be used for cleaning or polishing. In one aspect, the cloth may be made of micro fibers to reduce the incidence of scratching when used to clean or polish a device or surface.

As used herein, "cover member" refers to a cover or container of a material that is capable of having a cloth attached thereto, and storing a cloth substantially therein, while allowing the cloth to be extendable therefrom for use. In one aspect, the cover may be of a flexible material that is durable and waterproof, such as synthetic based comprising polychloroprene marketed under the Neoprene trade name.

As used herein, "insert" refers to a piece of rigid or semi-rigid material deliberately shaped to fit within the cover member and hold the cover member in an open position. The insert may also be referred to as a casing or sheath. The insert may take on a wide variety of shapes and geometric configurations.

As used herein, "attachment member" refers to a mechanism or method by which the cover member may be attached to another device, including without limitation, straps, loops, hooks, clasps, clips, snaps, etc.

As used herein, "fastener" refers to a structure or method which is capable of at least partially closing, and holding closed, the opening of a cover member. In some aspects, the opening may be entirely closed and in some aspects, made water tight. Examples of specific fasteners include without limitation, snaps, hooks, straps, cords, hook and loop fasteners (i.e. Velcro®), buttons, drawstrings, buckles, clasps, magnets, flaps, and zippers, among others.

As used herein, "plastic" refers to a rigid or semi-rigid polymeric material that can be extruded, molded, or cast into a number of different shapes. A wide variety of plastics are known to those of ordinary skill in the art, a number of which may be selected to provide a cover member with specifically desired characteristics.

The Invention

The present invention provides a cloth accessory 10 that is conveniently accessible for use in cleaning or treating a variety of devices and surfaces. Devices for which the cloth accessory may be particularly useful include lens bearing devices, such as eye glasses, goggles, high power magnification scopes, cameras, binoculars, safety glasses, sunglasses. Other devices for which the cloth accessory may be used include a wide variety of handheld objects such as cell phones, digital cameras, digital music players, personal digital assistants, video game consoles, etc., as well as protective covers and cases for such devices. In addition, the cloth accessory may be used to clean surfaces such as those associated windows, computer display screens, television screens and the like. The configuration and portability of the cloth accessory allow it to be conveniently used in cleaning or treating a device during an activity in which the device is used. Thus, for example, the cloth accessory can be carried with a cell phone and used to clean the face of the cell phone, which periodically becomes soiled from being pressed against a person's face.

Referring now to FIG. 1, a cloth accessory 10 is shown having a cover member 12 of a soft and flexible material. The cover member forms an enclosure with an opening 14 therein to be maintained in a substantially constant size and shape for retrieving and inserting a cloth 18. An insert (not shown) can be configured to fit within the cover member and hold the opening of the cover member in an open position with the substantially constant size and shape. With the open position fixed, a user may be able to retrieve and insert the cloth using only one hand, thus contributing to the overall convenience of the cloth accessory 10. The cloth is shown in a first configuration wherein the cloth is retracted substantially into the cover member and retained. The cloth can be stuffed, pushed, rolled, or otherwise placed substantially into the cover member for storage. The cover member additionally can have an attachment member 38 coupled to the cover member, for attaching or securing the cloth accessory to an article or device such as a lens bearing device or portable electronic device, a storage case therefore, video game console, article of clothing, or other object. Notably, the cloth can be optionally coupled or fixed to the cover member at an attachment point (not shown) to prevent the cloth from becoming separated from the cover member. In this way, the cloth may not be dropped or lost during its use.

Figure 2:
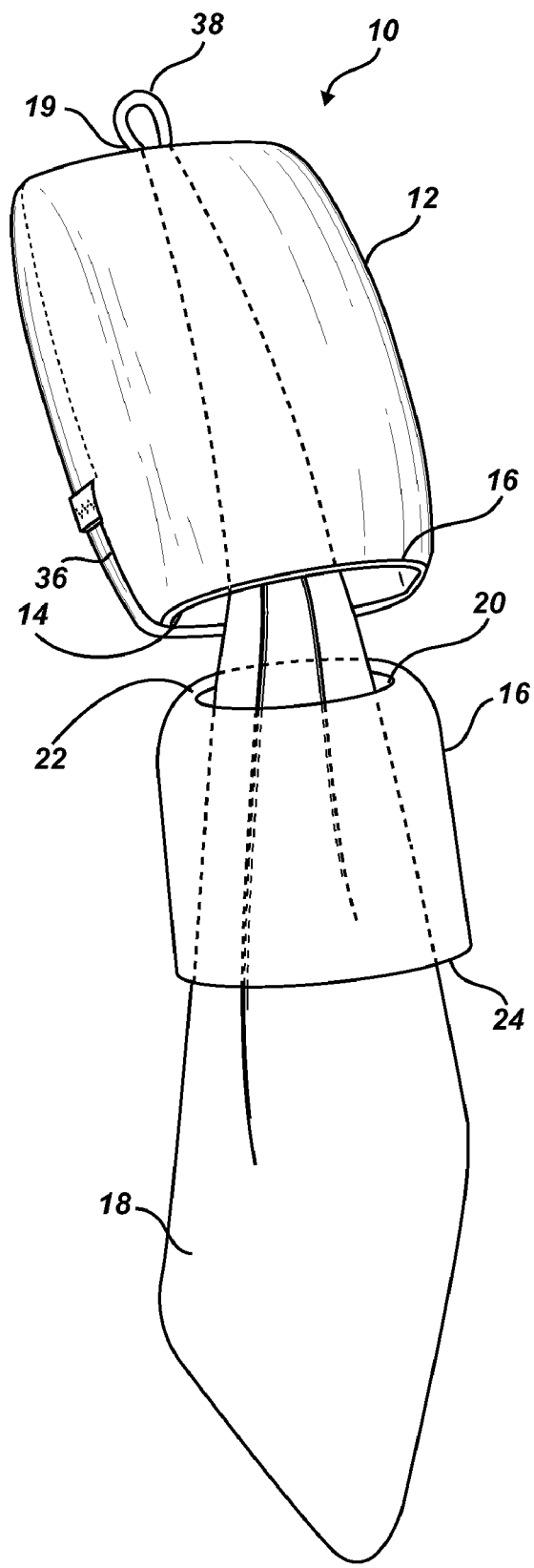
FIG. 2 is a perspective view of a cloth accessory wherein the insert is removed from the cover member, and the cloth is extended through the insert and substantially out of the opening of the cover member.

FIG. 2 shows the cloth accessory 10 with the cloth 18 in a second configuration, wherein the cloth originates from an attachment point 19 and is extended through the insert 16, through the opening 14 of the cover member 12, and substantially out of the opening of the cover member. Notably, the cloth can extend through the insert through an aperture in the insert in both the first and second configurations. The cloth can remain permanently attached to an inside portion of the cover member, although it can also be removable. In one aspect, as illustrated, the cloth can be coupled to an inside portion of the cover member at an attachment point substantially opposite the opening. The cloth may be used for cleansing or polishing a device or surface while extended in this configuration.

FIG. 2 further shows the insert 16 outside of the cover member 12. In some aspects, as illustrated, the insert is removable from the cover member. By way of example, and not by way of limitation, a force may be applied to the insert to remove it from the cover member. Alternatively, the cover member may be inverted to remove the insert therefrom. In another aspect, the insert can be fixedly attached to the inside of the cover member. In a further aspect, the insert can include a lid or cap (not shown) which may or may not be attached to the insert. Preferably, the lid can be attached to the insert to prevent the cap from becoming lost or separated from the insert. With the insert inside the cover member, the lid can be placed in a closed position to help maintain the first configuration wherein the cloth 18 is retracted into the cover member. Alternatively, the lid can be placed in an open position so that the cloth can extend out of the insert.

Figure 3:
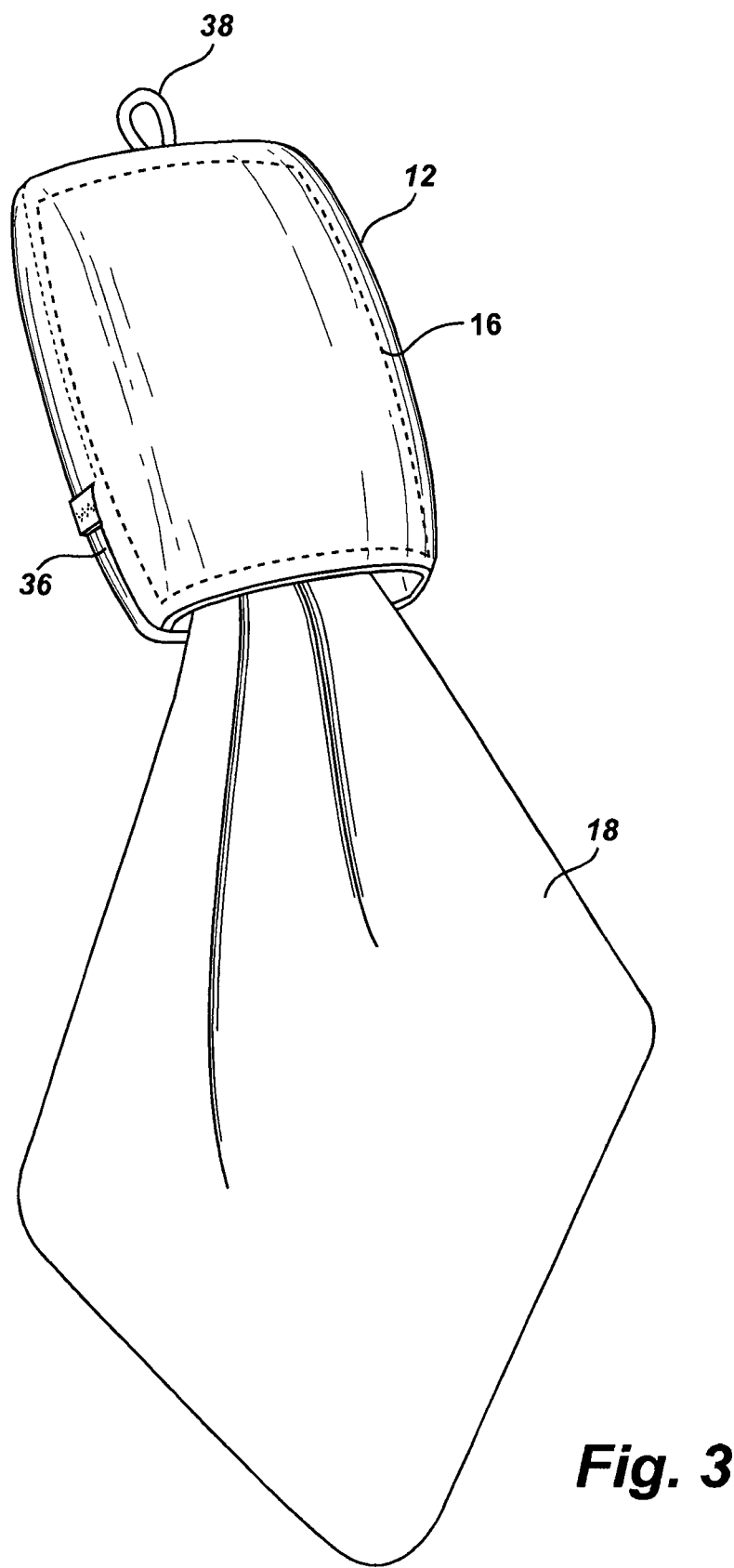
FIG. 3 is a perspective view of a cloth accessory wherein the insert is retained within the cover member and the cloth is extended through the insert and substantially out of the opening in the cover member.

Referring now to FIG. 3, a cloth accessory 10 is shown wherein the cloth 18 is in the second configuration, similar to the configuration shown in FIG. 2. As shown in this illustration, the insert 16 may optionally remain inside the cover member 12 when the cloth is in the second configuration. With the insert is inside the cover member, the opening of the cover member can be held in an open position for easy and convenient retrieval and insertion of the cloth.

As will be recognized by one skilled in the art, the insert 16 can fit within the cover member 12 based partly on the materials of the insert and cover member. Preferably, the insert can be configured to line at least a portion of an inner surface of the cover member and a friction fit exists between the cover member and the insert to prevent the insert from falling out of the cover member. Accordingly, the cover member can comprise an elastic material so that it can stretch around the outside of the insert, which may be larger than the cover member. In fact, in some aspects the insert can be sufficiently large as compared to the cover member that it dictates the shape of the cover member when engaged with the cover member.

In addition, the soft and flexible material of the cover member 12 can comprise a polymeric material. The cover member may be made from a number of suitable materials as required in order to achieve a specific result or desired purpose. The cover member may also be made water proof, either by the nature of the material selected, or a treatment applied thereto, and can also be made otherwise resistant to outdoor elements in order to protect as well as house the cloth 18. Examples of suitable soft or flexible materials include without limitation, fabrics, such as wool, cotton, polyester, rayon, fleece, and nylon, as well as polymeric materials, such as rubber, flexible plastics, neoprene, and vinyl. Further, natural materials, such as leather, or other skins may be used. As will be recognized by one of ordinary skill in the art, most if not all of the above-recited materials will be suitable for printing or screening in order to accommodate specific designs or logos to be printed thereon.

Referring now to the insert 16, it can be of a durable (i.e. rigid or semi-rigid) material. Thus, it will not collapse when it is placed within the cover member 12. Examples of durable materials include without limitation, plastics and other polymeric materials (which may or may not include a rubber material), metals, wood, etc.

FIGS. 4*a*-4*c* show various embodiments of an insert 16. According to the specific embodiment illustrated in 4*a*, the insert can be a cylinder. For example, the insert can have an upper opening 28 that is substantially the same size as a lower opening 30. In this case, the openings themselves can be, for example, round, oval, elliptical or any combination thereof. According to this aspect, the cloth can be extended through the upper opening of the insert when it is within the first configuration wherein it is retracted into the cover member for storage. When the cloth is in the second configuration, it can pass through both the upper and lower openings of the insert.

The insert 16 can take on a variety of shapes other than cylindrical. FIG. 4*b* shows a substantially bell-shaped insert wherein the insert has a cylindrical end 23 with an opening therein, and a tapered and rounded end 22 with an opening therein. In one aspect, as illustrated in FIG. 2, the upper opening 28 in the tapered and rounded end has a smaller size than a size of the lower opening 30 in the cylindrical end. In addition, the base of the lower opening in the cylindrical end 24 can be level to enable the insert to stand on its own.

In some aspects the upper opening 28 of the insert can be sufficiently small so that the insert 16 is slidably coupled to the cloth. According to this aspect, the upper opening of the insert can frictionally engage the cloth and be held in place without sliding down the cloth, even if the cover member is in an inverted position and not engaged with the insert. The portion of the insert surrounding the upper opening may be roughened, notched or serrated to increase the friction between the cloth and insert, although this is not required. In another aspect, the upper opening may be sufficiently large so as to substantially avoid friction between the cloth and the insert.

With respect specifically to FIG. 4*c*, the insert 16 can take the shape of a ring. The ring can rest inside the opening of the cover member 12 to maintain the opening over the cover member in a substantially constant size and shape. According to some aspects, as illustrated in FIG. 5, the insert 16 can be substantially permanently positioned within the cover member, and in some cases, contained within a secured fold 32 around the opening of the cover member. The fold can be sewn or glued to maintain a fixed position around the insert.

As indicated and regardless of the shape taken, the insert 16 can have a length which extends along a portion of and lines an inner surface of the cover member 12. In some aspects, the insert may line substantially the entire inner surface of the cover member. Alternatively, the insert can extend about half, less than half, or three quarters of a length of the cover member and terminate at about a lowermost edge 26 of the cover member.

Figure 6:
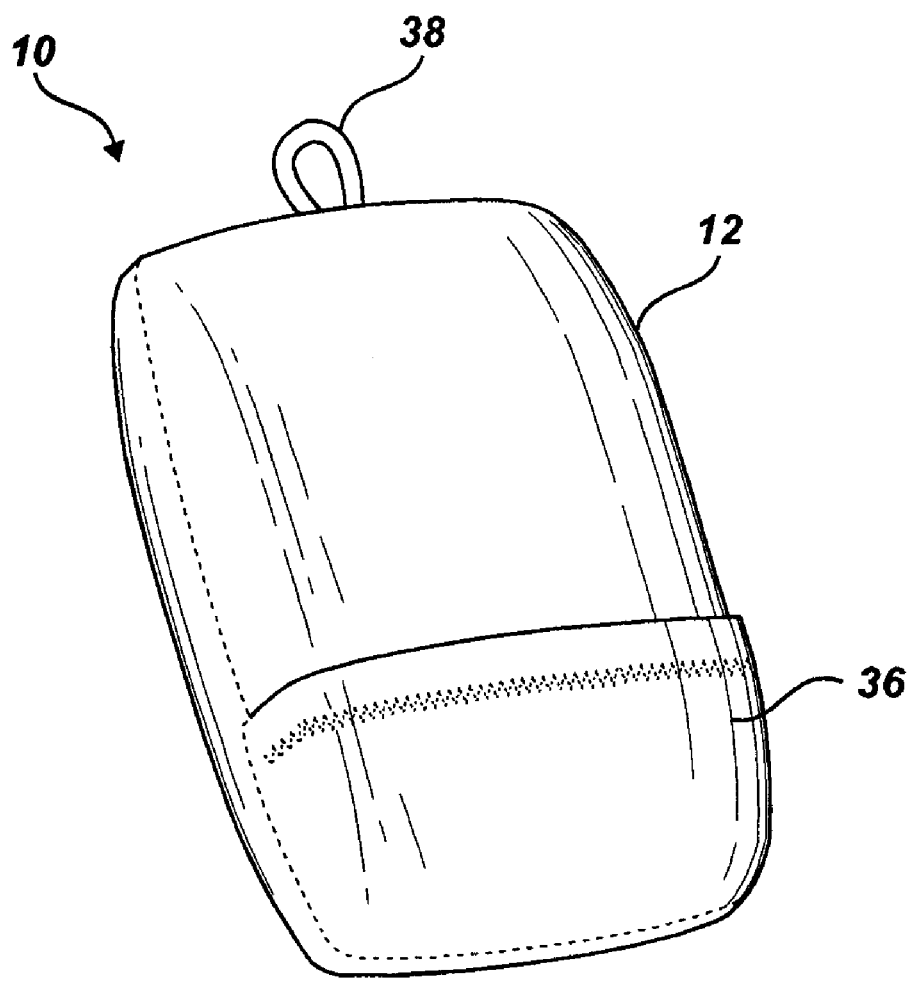
FIG. 6 is a perspective view of a cloth accessory wherein a flap integral with the cover member is folded over an outside portion of the cover member.

Referring specifically to FIG. 6, in one aspect, the insert and cloth can be retained in the cover member 12 through the use of a flap 36 or fastener. Preferably the flap can be configured to fold over an outside portion of the cover member and substantially close the opening of the cover member, as shown. It will be appreciated that the flap can be integral with the cover member, although this is not required, and in some aspects may be coupled to the cover member by way of a fastening mechanism such as a stitch, button, or snap.

The flap 36 may be used alone to close the opening of the cover member or in connection with other fastening mechanisms. In some embodiments, fasteners, other than a flap, may be used alone to substantially close the opening. A wide variety of fasteners and fastening mechanisms may be employed to close the opening. Examples of suitable fasteners include without limitation, snaps, buttons, drawstrings, hook and loop fasteners (i.e. Velcro®), zippers, and clasps. In one aspect, the fastener may be a hook and loop fastener. In another aspect, the fastener may be a snap. In yet another aspect, the fastener may be a drawstring. In some cases, the mechanism for closing the opening may not be associated with the cover member, but rather can be associated with the insert. For example, a lid or cap (not shown) as described above can be used to close the opening of the insert and thus the opening of the cover member when the insert is positioned within the cover member.

According to one aspect, an attachment member 3 8 may be used in connection with the cloth accessory 10 to secure the cloth accessory to another article. The attachment member 38 may take a variety of configurations or mechanisms that are capable of attaching the cloth accessory to a desired article, such as a lens-bearing device, hand-held electronic device, carrying case therefore, article of clothing, key chain, etc. In one aspect, the attachment member may be a simple loop of desired material and length. In this case, the loop is wound around a portion of the object to which the accessory 10 is being secured, and then the cover member 12 is slipped through an open end of the loop and the loop pulled tight to take up any slack. The material used for such a loop may be elastic to further provide a tight attachment to the object. Those of ordinary skill in the art will recognize that a host of other specific devices and methods may be used to secure the accessory to a desired object, including without limitation, lanyards, clasps, straps, cords, snaps, clips, and buckles. However, in one aspect, the attachment member may be an elastic loop. In another aspect, the attachment member may be a cord.

The cloth 18 that is used in connection with the cover member may be made of a wide variety of materials and fabrics that are suited to accomplish a specific purpose such as cleaning or treating the lens of a lens-bearing device, or cleaning the surface of an electronic device or a screen or display panel associated therewith without scratching the device or surface being treated. Nearly any woven or non-woven fabrics may be used. Further, fabrics with a selected degree of absorbability may be used with some cloths being selected to be more absorbent than others. Examples include without limitation, cotton, polyester, and other cloths, microfiber cloths, super absorbent cloths or materials, such as chamois, and other natural or synthetic absorbent materials. In one aspect, the cloth may be a microfiber cloth. The cloth may additionally be configured to hold a variety of solutions and/or compositions useful in treating lens-bearing devices, electronic devices, and various surfaces, such as cleaning and anti-fog solutions, polishes, waxes, etc.

Furthermore, the cloth 18 may be of a variety of shapes and sizes. Circular, square, rectangular, triangular, hexagonal, and other custom designed shapes and geometrical configurations may be used. The only specific limitation on this aspect of the invention is that the cloth not be so big as to be unable to fit inside the cover member 12 as indicated herein. In one aspect, the cloth may have a length that is sufficient to allow it to be useful for cleaning or treating a device or surface, such as those mentioned herein. As such, the cloth can extend out of the cover member even when it is attached to the cover member at a point of attachment substantially opposite the opening. According to one aspect, the length of the cloth may be at least about twice the distance from the point of attachment to the opening. In another aspect, such a length may be at least about three or four times this distance.

Further, in one aspect, the cloth 18 may be either directly or indirectly coupled to the inside portion of the cover member 12 at nearly any convenient point of attachment, using a variety of attachment mechanisms, which either render the cloth permanently fixed to the cover member, or removable from the cover member. As shown in FIG. 2, the cloth is attached near a central portion of the inside of the cover member. In fact, in one aspect, the point of cloth attachment may be inside the cover member at substantially the same location as the attachment member outside of the cover member. In this manner, the overall strength of the cloth attachment point may be improved while manufacture thereof may be simplified. Moreover, in one aspect, the cloth may not be directly attached to the cover member, but may rather be attached to a cord, lanyard, or the attachment member 38. In such an embodiment, the attachment member extends through a small aperture in the cover member. The cloth is then removably held in the cover member either by the frictional force of the cover member surrounding the attachment member extending therethrough, or may be removably or permanently held in place by one of the other attachment mechanisms set forth herein. For example, the cover member may be fused or sewn to the attachment member protruding therethrough.

While the point of attachment location substantially opposite the opening may be advantageous in some embodiments, the point of attachment may be located at a point much closer to the opening 14 when desired. In one aspect, the point of attachment may be right at the opening, or just within the opening. Such points of attachment may be especially useful if the cover member 12 is made of a more rigid material, rather than a soft flexible material. Such an attachment point may also be used with a soft and flexible cover member. Moreover, in some aspects of the invention, the cloth may be attached to the cover member at an attachment point that is located on the outside thereof, rather than inside the cover member.

Permanent attachment mechanisms for the cloth 18 the cover member 12 may include gluing, stitching, melting, or otherwise fusing the cloth to the inside of the cover member at the desired attachment point. Removable attachment mechanisms may include without limitation, snaps, hook and loop fasteners (i.e. Velcro®), or buttons. As will be recognized, the removing mechanisms allow the cloth to be removed from the cover member for washing or other cleaning or treatment. The optional removing mechanisms, however, may allow replacement of the cloth when worn out, or if damaged without the necessity of replacing the entire device. When the cover member is made of a soft and flexible material, the cloth may simply be extended out therefrom, and the cloth and cover member placed in a washing machine, etc. to accomplishing cleaning or other treatment of the cloth.

In one aspect of the present invention, the cover member 12 may be an extension of the cloth 18 itself, which is configured to accommodate the rest of the cloth which is folded, rolled, or wadded, and secured inside. As will be recognized by those skilled in the art, a number of flap, sleeve, and pouch designs can be employed to achieve this embodiment. Further, in such an embodiment, the attachment member and optional fastener can be attached directly to the cover member portion of the cloth.

The present invention also encompasses methods for use of the device set forth herein. In one aspect, the present invention includes methods for cleaning or treating a device or surface by providing cloth accessory as recited herein, orienting the cloth into the second configuration wherein the cloth is extended substantially out of the cover member, and contacting the device or surface in a manner sufficient to clean or treat the device or surface.

Numerous modifications and alternative arrangements may be devised by those skilled in the art without departing from the spirit and scope of the present invention and the present invention is intended to cover such modifications and arrangements. Thus, while the present invention has been described above with particularity and detail in connection with what is presently deemed to be the most practical and preferred embodiments of the invention, it will be apparent to those of ordinary skill in the art that numerous modifications, including, but not limited to, variations in size, materials, shape, form, function, manner of operation, assembly, and use may be made without departing from the principles and concepts set forth herein.

What is claimed is:

1. A cloth accessory comprising:
   a cover member of a soft and flexible material forming an enclosure with an opening therein to be maintained in a substantially constant size and shape, said cover member including a flap configured to fold over an outside portion of the cover member and substantially close the opening of the cover member;
   an insert configured to fit within the cover member and hold the opening of the cover member in an open position with the substantially constant size and shape, wherein the insert is removable from the cover member; and
   a cloth held in the cover member, the cloth having a first configuration wherein the cloth is retracted substantially into the cover member for storage and a second configuration wherein the cloth is extended through the insert and the opening of the cover member, and substantially out of the cover member for use.

2. The cloth accessory of claim 1, wherein the cloth is coupled to the cover member substantially opposite the opening.

3. The cloth accessory of claim 1, wherein the cloth is extended through an aperture in the insert in the first configuration and in the second configuration.

4. The cloth accessory of claim 1, wherein the insert is semi-rigid.

5. The cloth accessory of claim 4, wherein the insert comprises a polymeric material.

6. The cloth accessory of claim 1, wherein the insert is slidably coupled to the cloth.

7. The cloth accessory of claim 1, wherein the insert is held in place by primarily a friction fit between the cover member and the insert.

8. The cloth accessory of claim 1, wherein the insert is sufficiently large as compared to the cover member such that it dictates a shape of the cover member when it is within the cover member.

9. The cloth accessory of claim 1, wherein the insert has a length which extends along and lines at least a portion of an inner surface of the cover member.

10. The cloth accessory of claim 1, wherein the insert has a cylindrical end with an opening therein, and a tapered and rounded end with an opening therein having a size smaller than a size of the opening in the cylindrical end.

11. The cloth accessory of claim 10, wherein the opening in the cylindrical end is elliptical in shape.

12. The cloth accessory of claim 1, wherein the cover member is an extension of the cloth.

13. The cloth accessory of claim 1, wherein the cloth is coupled to the cover member by a cord slidably engaged and extending through the cover member.

14. The cloth accessory of claim 1, wherein the cloth is removably coupled to the cover member.

15. The cloth accessory of claim 1, wherein the cloth has a length of at least about twice a distance from a point at which the cloth is coupled to the cover member to the opening of the cover member.

16. The cloth accessory of claim 1, wherein the flap is integral with the cover member.

* * * * *